(12) United States Patent
    Choi et al.

(10) Patent No.: US 12,405,781 B2
(45) Date of Patent: Sep. 2, 2025

(54) SYSTEMS AND METHODS FOR AUTOMATICALLY UPDATING SYSTEM FIRMWARE

(71) Applicant: National Technology & Engineering Solutions of Sandia, LLC, Albuquerque, NM (US)

(72) Inventors: Sung Nam Choi, Sandia Park, NM (US); John C. Pavlakos, Albuquerque, NM (US); Neil Sparks, Albuquerque, NM (US); Adrian R. Chavez, Davis, CA (US); Alan Sonntag, Albuquerque, NM (US); Florentino Barrientos, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 196 days.

(21) Appl. No.: 18/237,667

(22) Filed: Aug. 24, 2023

(65) Prior Publication Data
US 2024/0069889 A1   Feb. 29, 2024

Related U.S. Application Data

(60) Provisional application No. 63/400,893, filed on Aug. 25, 2022.

(51) Int. Cl.
*H04W 12/04*   (2021.01)
*G06F 8/65*    (2018.01)
*G06F 21/57*   (2013.01)
*H04L 9/32*    (2006.01)

(52) U.S. Cl.
CPC .............. *G06F 8/65* (2013.01); *G06F 21/572* (2013.01); *H04L 9/3239* (2013.01); *H04L 9/3247* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 10,541,996 B1 | 1/2020 | Choi et al. | |
| 11,070,532 B1 | 7/2021 | Choi | |
| 11,240,014 B1 * | 2/2022 | Maganti | H04L 9/002 |

(Continued)

OTHER PUBLICATIONS

PCT ISR for PCT/US2023/031048 filed Aug. 24, 2023, 8 pages.

*Primary Examiner* — Christopher B Robinson
(74) *Attorney, Agent, or Firm* — Daniel J. Jenkins (57) ABSTRACT

In an approach to secure firmware updating, a system comprises: one or more user devices, each of the one or more user devices having one or more firmware modules; one or more computing devices; a digital signature repository; and a z-engine circuitry. The z-engine circuitry is configured to: receive firmware for a particular user device of the one or more user devices; receive a non-repeating input data; retrieve a hardware digital profile of the particular user device from the digital signature repository; process the non-repeating input data with the hardware digital profile to generate a unique result; perform a hash operation on the unique result to generate an encryption key; encrypt the firmware for the particular user device with the encryption key; and send the encrypted firmware to the particular user device.

20 Claims, 9 Drawing Sheets

(56) References Cited

U.S. PATENT DOCUMENTS

| | | | |
|---|---|---|---|
| 11,336,462 B1* | 5/2022 | Maganti | H04L 9/0852 |
| 11,343,270 B1* | 5/2022 | Carter, Jr. | H04L 9/088 |
| 11,477,016 B1* | 10/2022 | Carter, Jr. | G06F 21/577 |
| 2002/0006625 A1 | 1/2002 | Chu | |
| 2004/0096056 A1 | 5/2004 | Boren et al. | |
| 2017/0034167 A1 | 2/2017 | Figueira | |
| 2017/0302450 A1* | 10/2017 | Ebrahimi | H04L 9/0643 |
| 2019/0007215 A1 | 1/2019 | Hakuta et al. | |
| 2021/0383376 A1* | 12/2021 | Silvestri | H04W 12/03 |

\* cited by examiner

SYSTEMS AND METHODS FOR AUTOMATICALLY UPDATING SYSTEM FIRMWARE

CROSS-REFERENCE TO RELATED APPLICATIONS

The present application claims the benefit of U.S. Provisional Application Ser. No. 63/400,893, filed Aug. 25, 2022, the entire teachings of which application is hereby incorporated herein by reference.

STATEMENT REGARDING FEDERALLY SPONSORED RESEARCH OR DEVELOPMENT

This invention was made with government support under Contract No. DE-NA0003525 awarded by the United States Department of Energy/National Nuclear Security Administration. The government has certain rights in the invention.

TECHNICAL FIELD

The present application relates generally to system maintenance and, more particularly, to systems and methods for secure firmware updating.

BACKGROUND

Many hardware devices require periodic firmware updates to correct problems discovered in the deployed firmware as well as to add additional features. In some applications, such as the automotive industry, these firmware updates must be performed in a secure manner due to potential safety issues with systems such as antilock brakes. In many other industries as well, e.g., medical equipment or critical infrastructure, the updating of firmware must be performed in a secure manner. Traditionally, these updates may require service calls to securely update the firmware.

Physically unclonable functions (PUFs) are innovative physical security primitives that produce unclonable and inherent instance-specific measurements of physical objects; in many ways, they are the inanimate equivalent of biometrics for human beings. A PUF is a physical object that provides a physically defined "digital fingerprint" that serves as a unique identifier. PUFs are often based on unique physical variations occurring naturally during manufacturing, for example, in semiconductors. A PUF is a physical entity embodied in a physical structure. PUFs may be implemented in integrated circuits, including Field Programmable Gate Arrays (FPGAs), and can be used in applications with high-security requirements, more specifically cryptography, and privacy protection.

BRIEF DESCRIPTION OF THE DRAWINGS

Reference should be made to the following detailed description which should be read in conjunction with the following figures, wherein like numerals represent like parts.

DETAILED DESCRIPTION

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this disclosure as suitable. In other words, features between the various exemplary embodiments described herein are interchangeable, and not exclusive.

Many devices today utilize embedded computing devices that contain firmware or software that must be updated periodically. For example, current automotive technology relies on electronic control units (ECUs) for many functions of modern vehicles. An ECU is a miniature computer designed to handle a specific vehicle function. Modern automotive vehicles may contain 50 to 150, or more, separate ECUs, each of which may require firmware updates at times during the life of the vehicle. Some ECU and/or firmware updates may require a manufacturer recall, especially if the updates are crucial to safety, e.g., a brake system ECU or an airbag system ECU.

With 50 to 150 ECUs equipped in an average modern vehicle, almost every function is either controlled or monitored by software/firmware. For example, ECUs are built into the powertrain to run features like advanced driver-assistance systems (ADAS) and to monitor turning angles and road conditions to allow for on-demand all-wheel drive and traction control. Having more software inherently increase potential for software-related issues. In the mid-2010s, original equipment manufacturers (OEMs) experienced a drastic increase in the number of emergency recalls related to software flaws and errors, with the percentage of software-related recalls reaching 46% in 2016. Timely recalls are especially important for software parts that are crucial to safety. Furthermore, the numbers of lines of codes (LOCs) per vehicle can range anywhere from 100 to 300 million LOC and will likely increase in the future. Sending a complete firmware package to a vehicle when only a subset of the ECUs require updating may unnecessarily place significant capacity load on communication throughput and render the vehicle inoperable for too long.

Traditionally, for most vehicle manufacturers, software updates are performed in person at service centers. But as vehicles become increasingly software defined, connected vehicle OEMs are trying a new approach by sending and installing software updates using Over-The-Air (OTA) mechanisms, e.g., satellite, Wi-Fi, cellular, etc., directly to vehicles similar to the way that smartphones and computers receive updates. OTA updates help automotive manufacturers reduce vehicle warranty and recall costs and offer a mechanism to implement safety-related and legally relevant corrective measures in a faster, more customer-friendly and efficient manner than with a traditional physical recall.

To enable OTA updates, vehicles may be equipped with a specialized ECU (i.e., Main Control Unit—(MCU)) that can securely communicate with the manufacturer and also with all the ECU components in the vehicle. The MCU must also be able to store older versions of firmware for all the ECUs used in the vehicle for redundancy and reversion in case updated versions do not function correctly or when physically damaged ECU components are replaced. The MCU may also need regular or periodic updates since it is the brain behind the logistics of applying and pushing out firmware updates for every ECU component in the vehicle.

Unfortunately, the automotive industry currently lacks a standardized means to verify the integrity and authenticity of software updates. For example, one OEM might have several different ways to confirm software updates for some of its components and/or rely on a complex supply chain for updates and their delivery. Equipping vehicles with OTA capable firmware updating has many benefits, but it also creates a greater attack surface for hackers. Attackers may attempt to corrupt the software update kits with malware and enter the vehicle system to steal personal data or even take physical control with frightening consequences. To prevent this risk, not only must OEMs ensure that their vehicle connections are secured, but also, an increasing number of regulatory bodies are mandating vehicular cybersecurity. For example, recent releases of the United Nations Economic Commission for Europe (UNECE) WP.29 regulation now require cybersecurity-specific approvals for all new connected vehicles.

Even in the best case scenario where a vehicle OEM can enforce the standardization for firmware OTA updates, currently the best available technology that the automotive industry can utilize is Public Key Infrastructure (PKI). PKI must be utilized for identity verification (i.e., authenticity), integrity checks (for code integrity), as well as confidentiality services. In addition, the use of the PKI requires secure key storage in a Key Management System (KMS). A KMS is a system for the management of cryptographic keys and their metadata (e.g., generation, distribution, storage, backup, archive, recovery, use, revocation, and destruction). Both PKI and KMS are expensive to deploy, maintain, and secure.

There exists a need for systems and methods to securely distribute firmware upgrades to hardware devices using an OTA mechanism to avoid a user having to bring the device in person to a service center or dispatch a technician for a service call. Disclosed herein is a system for compiling custom firmware packages for particular devices and securely distributing the custom firmware package to the particular hardware device. In some embodiments, the disclosed system may use OTA mechanisms. In some embodiments, the firmware update may be initiated by the particular hardware device. In some other embodiments, the user of the particular hardware device may be notified that one or more firmware upgrades are available for the particular hardware device, and the firmware update can subsequently be initiated.

The disclosed firmware update protocol bypasses the need for PKI by leveraging the black box digital key generation and identity verification capabilities of the Zero-Trust application (ZTa). The ZTa generates a secure message (potentially in a single packet of message capable of providing confidentiality, integrity, and authenticity/availability checks) between two end points, such as a Firmware as a Service (FaaS) system, e.g., a vehicle manufacturer, and a user device, e.g., a vehicle MCU.

Using the disclosed system, a tamper evident device can be built where known data enters a black box and gets modified in an unpredictable way that produces a pattern unique to the black box. It is not the information but the behavior of the black box which may be used to identify the device uniquely.

In use, a manufacturer aggregates all firmware versions under its firmware library and the FaaS system has the ability to package any firmware necessary for a particular user device into a single bundle appropriate for that particular device, e.g., for a particular vehicle year, make, and model type. The manufacturer is responsible for communicating and updating the firmware specific to individual vehicles.

While the systems and methods disclosed herein are applicable to any hardware device that may require secure firmware upgrades, for clarity, the following discussion will be directed primarily to the automotive industry. Although the need for the disclosed systems and methods in the automotive industry has been presented above, the systems and methods disclosed herein are applicable to any other hardware device requiring secure firmware updates, as would be apparent to one skilled in the art.

Figure 1:
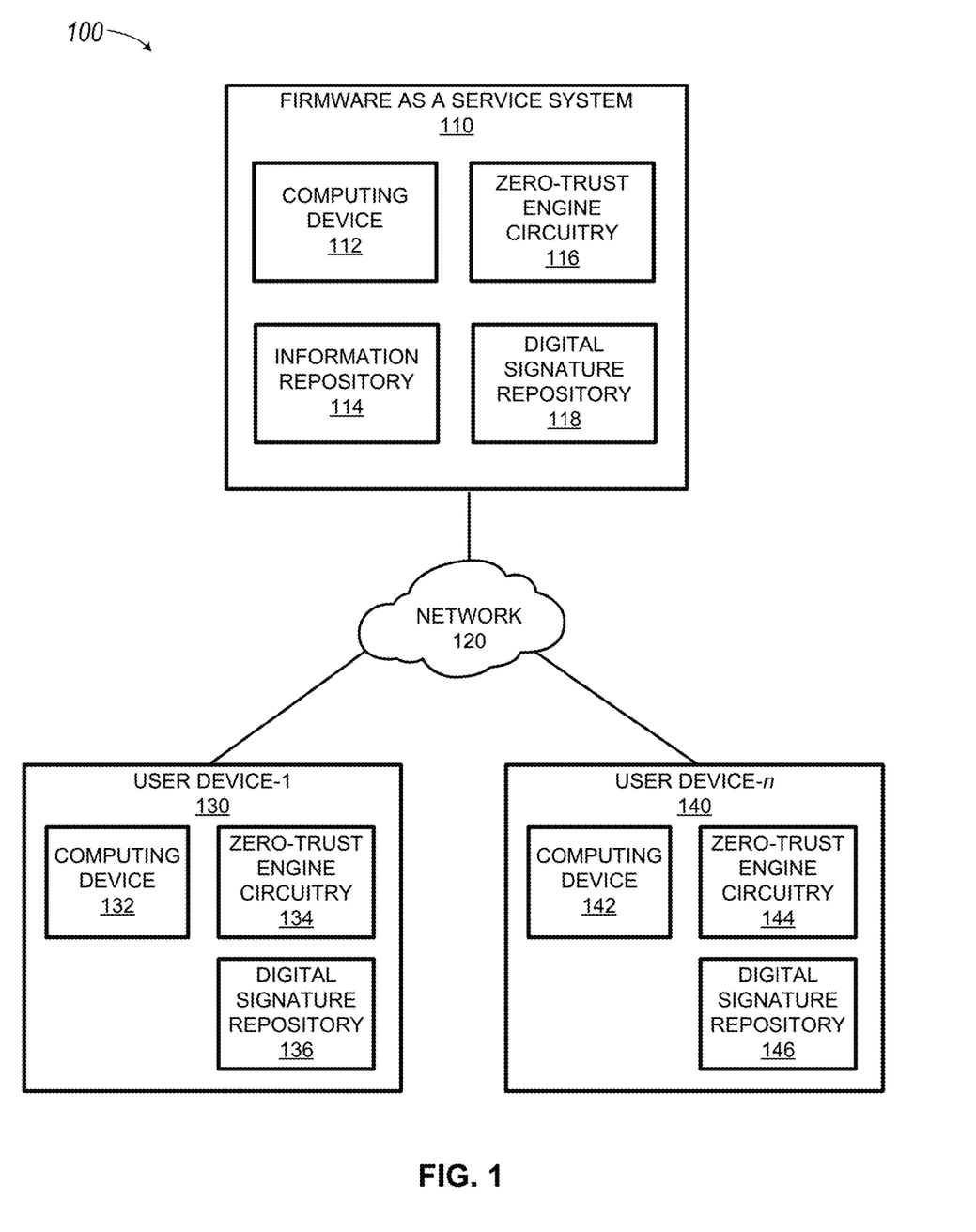
FIG. 1 is a functional block diagram illustrating one illustrative example of a distributed data processing environment suitable for operation of the system for secure firmware updating consistent with the present disclosure.

FIG. 1 is a functional block diagram illustrating one illustrative example of a distributed data processing environment, generally designated 100, suitable for operation of the system for secure firmware updating consistent with the present disclosure. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the disclosure as recited by the claims.

The example system illustrated in FIG. 1, as well as the description of the operation of the example system of FIG. 1 that follow, are directed to one illustrative example, i.e., a system for secure updating of firmware for a motor vehicle. Although the example of a motor vehicle is used for clarity, it should be noted that the systems disclosed herein are applicable to other systems that require secure, individualized control of firmware updates.

Distributed data processing environment 100 includes FaaS system 110 optionally connected to network 120. FaaS system 110 may be a cloud service that allows manufacturers, e.g., automobile manufacturers, to dynamically generate and package firmware updates unique to each particular system or device, e.g., each particular vehicle, and securely transmit those updates to user devices, such as a particular vehicle, e.g., ECU components for the particular vehicle.

Network 120 can be, for example, a telecommunications network, a local area network (LAN), a wide area network (WAN), such as the Internet, a satellite network, or a combination of networks, and can include wired, wireless, or fiber optic connections. In general, network 120 can be any combination of connections and protocols that will support communications between FaaS system 110, user device-1 130 through user device-n 140, and other devices (not shown) within distributed data processing environment 100.

FaaS system 110 may include computing device 112, information repository 114, z-engine circuitry 116, and digital signature repository 118. Computing device 112 can be a standalone computing device, a management server, a web server, a mobile computing device, or any other electronic device or computing system capable of receiving, sending, and processing data. In another embodiment, computing device 112 can represent a server computing system utilizing multiple computers as a server system, such as in a cloud computing environment. In yet another embodiment, computing device 112 represents a computing system utilizing clustered computers and components (e.g., database server computers, application server computers) that act as a single pool of seamless resources when accessed within distributed data processing environment 100.

In an embodiment, computing device 112 includes information repository 114. In an embodiment, information repository 114 may be managed by computing device 112. In an alternate embodiment, information repository 114 may be managed by the operating system of the computing device 112, alone, or together with, computing device 112. Information repository 114 is a data repository that can store, gather, compare, and/or combine information. In some embodiments, information repository 114 is located externally to computing device 112 and accessed through a communication network, such as network 120. In some embodiments, information repository 114 is stored on computing device 112. In some embodiments, information repository 114 may reside on another computing device (not shown), provided that information repository 114 is accessible by computing device 112. In an embodiment, information repository 114 may be a repository for the aggregated firmware for the FaaS system, and may include, but is not limited to, firmware data, e.g., car model, time stamp, software version, etc., and other data that is received by FaaS system 110 from one or more sources, and data that is created by FaaS system 110.

FaaS system 110 also includes z-engine circuitry 116, and digital signature repository 118. Z-engine circuitry 116 is a cryptographic key generation engine that is capable of dynamically generating secure encryption keys based on a hardware digital profile of the particular device, e.g., a particular vehicle MCU. Once the dynamic secure encryption key for the particular hardware device is generated, it is used to encrypt the firmware to be sent to the particular hardware device, e.g., the MCU of a particular vehicle. The operation of the z-engine circuitry 116 is further described in FIG. 3.

Digital signature repository 118 is a secure repository contained in a tamper resistant hardware environment for storing the hardware digital profile for each device that is registered with the FaaS system 110 to receive secure firmware updates. The digital signature repository 118 is accessible only by the z-engine circuitry 116 and cannot otherwise be accessed.

Distributed data processing environment 100 also includes user device-1 130 through user device-n 140. User device-1 130 through user device-n 140 may each be a particular user device, e.g., a vehicle, that is registered with the FaaS system 110 to receive dynamically generated and packaged firmware updates unique to that particular user device. User device-1 130 includes computing device 132 and user device-n 140 includes computing device 142, which may each be, for example, an ECU. In some instances, computing device 132 and computing device 142 may each be an MCU that receives the packaged firmware for the vehicle and distributes specific firmware modules to the appropriate ECUs in the vehicle.

User device-1 130 includes z-engine circuitry 134 and digital signature repository 136 and user device-n 140 includes z-engine circuitry 144 and digital signature repository 146. Z-engine circuitry 134 and z-engine circuitry 144 are cryptographic key generation engines that are capable of dynamically generating secure encryption/decryption keys based on the hardware digital profile of the particular device, e.g., the particular vehicle. In an embodiment, z-engine circuitry 134 and z-engine circuitry 144 are essentially identical architecture of z-engine circuitry 116. In user device-1 130 through user device-n 140, the z-engine circuitry 134 and z-engine circuitry 144 dynamically generate the secure encryption/decryption key based on the hardware digital profile of the subscriber's particular device, e.g., the subscriber's particular vehicle.

Digital signature repository 136 and digital signature repository 146 are secure repositories similar to digital signature repository 118 and are also contained in tamper resistant hardware environments for storing the hardware digital profile for user device-1 130 and user device-n 140, respectively. In embodiments where a user device, e.g., user device-1 130, may have a plurality of individual functions that may require firmware updates, e.g., multiple ECUs in a vehicle, the MCU for that hardware device will generate and endow the individual functions, e.g., the individual ECUs, with unique z-engines and escrow all the z-engines of the particular hardware device, e.g., user device-1 130. The digital signature repository for that user device, e.g., digital signature repository 136 for the user device-1 130, will be the repository for all the z-engines for that particular hardware device. Digital signature repository 136 and digital signature repository 146 are accessible only by the z-engine circuitry in the respective hardware device, i.e., user device-1 130 and user device-n 140, respectively, and cannot otherwise be accessed.

Figure 2:
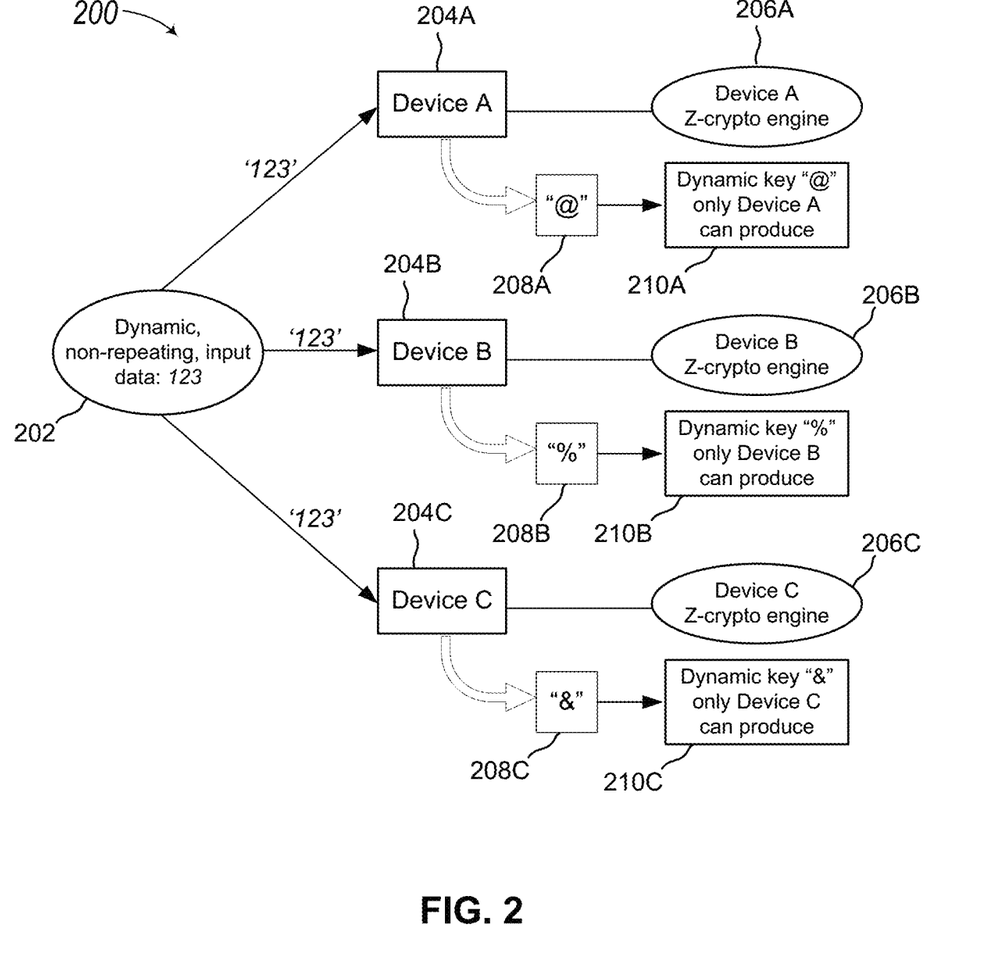
FIG. 2 is an illustrative example of the generation of dynamic zero-trust cryptographic keys consistent with the present disclosure.

FIG. 2 is an example 200 of the generation of dynamic zero-trust cryptographic keys consistent with the present disclosure. In the example of FIG. 2, a dynamic, non-repeating input data 202 is used by three separate devices, device A 204A, device B 204B, and device C 204C, to generate unique keys for each device. For illustrative purposes, the non-repeating input data 202 is the string "123," but in practice, the non-repeating input data 202 can be any input number that does not repeat. Some examples of the non-repeating input data 202 may include, but are not limited to, Unix timestamp (a timestamp representing the time as the number of seconds since Jan. 1, 1970 at 00:00:00

Coordinated Universal Time (UTC)), an incremented number starting at "1," a number starting from a 16-digit generated pseudo random number and incremented by one each use, a number starting from a 4-digit number generated by a True Random Number Generator (TRNG) and incremented by 1 each use, a number starting from a 16-digit number generated by a TRNG and incremented by one each use, or a date and time in the format mm:dd:yyyy:hh:mm:ss.

When the non-repeating input data 202 is received by each device, that device generates a dynamic key using the z-engine, specific to that hardware device. For example, device A 204A uses z-engine 206A to generate a unique, dynamic key 208A, in this example the "@" symbol. Z-engine 206A generates key 208A by using the hardware digital profile of device A 204A, which is known only to z-engine 206A (as well as to the FaaS system, such as FaaS system 110 from FIG. 1), and cannot be read or retrieved from the z-engine 206A. Since the unique hardware entity of device A is based on black box z-engine properties of device A, as shown in result 210A, the dynamic key 208A can be produced only by device A 204A and the designated authenticity entity such as FaaS system 110 from FIG. 1.

Likewise, device B 204B generates a unique key 208B using z-engine 206B, and since device B 204B has a unique z-engine hardware digital profile, the key 208B, in this example the "%" symbol, is also unique, as shown in result 210B. Finally, device C 204C generates a unique key 208C using z-engine 206C, and since device C 204C has a hardware digital profile, the key 208C, in this example the "&" symbol, is also unique, as shown in result 210C. While all three devices received the identical input "123," all three devices produced unique outputs only attributable to the individual hardware.

Figure 3:
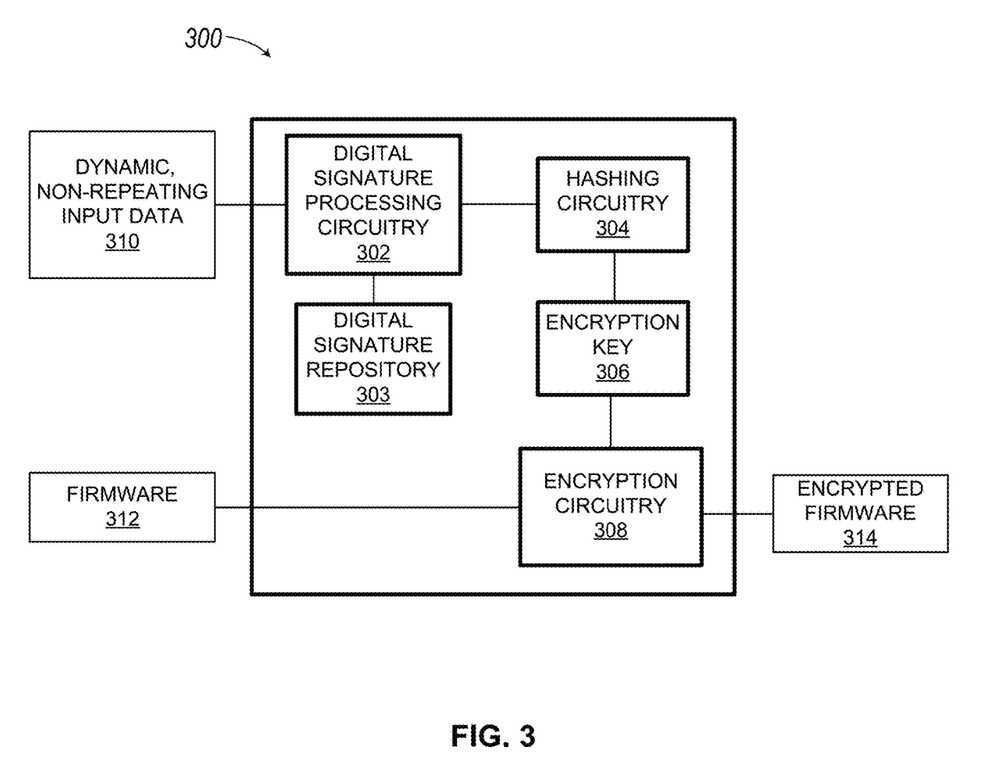
FIG. 3 is a functional block diagram of one illustrative example of a zero-trust cryptographic engine consistent with the present disclosure.

FIG. 3 is a functional block diagram of an illustrative example of z-engine 300 consistent with the present disclosure. In an embodiment, the z-engine 300 may be, for example, z-engine circuitry 116, z-engine circuitry 134, and/or z-engine circuitry 144 from FIG. 1. It should be noted that the illustrative example block diagram of FIG. 3 is applicable to a z-engine in either the server, e.g., FaaS system 110, or a client, e.g., user device-1 130 or user device-n 140.

Z-engine 300 includes digital signature processing circuitry 302, hashing circuitry 304, encryption key 306, and encryption circuitry 308. The z-engine 300 receives firmware data and non-repeating input data 310 and passes the non-repeating input data to the digital signature processing circuitry 302.

The digital signature processing circuitry 302 uses the hardware digital profile for the particular system or device that the firmware is being encrypted for, e.g., a particular vehicle, which was stored in the digital signature repository 303 when the particular system or device was registered. The non-repeating input data 310 is processed by the digital signature processing circuitry 302, which performs a Boolean algebraic function of the non-repeating input data 310 and the hardware digital profile for the particular system or device to create the dynamic, unique result. The algebra function may be, but is not limited to, an XOR function. The dynamic, unique result is then hashed by hashing circuitry 304 to generate a seed for a symmetric encryption key 306.

Encryption circuitry 308 receives the input firmware 312 in addition to the encryption key 306 and encrypts the firmware 312 to generate encrypted firmware 314. It should be noted that the firmware 312 may consist of one or more firmware modules, where each firmware module may be targeted to a specific function on the user device, e.g., a specific ECU on a particular vehicle.

Figure 4:
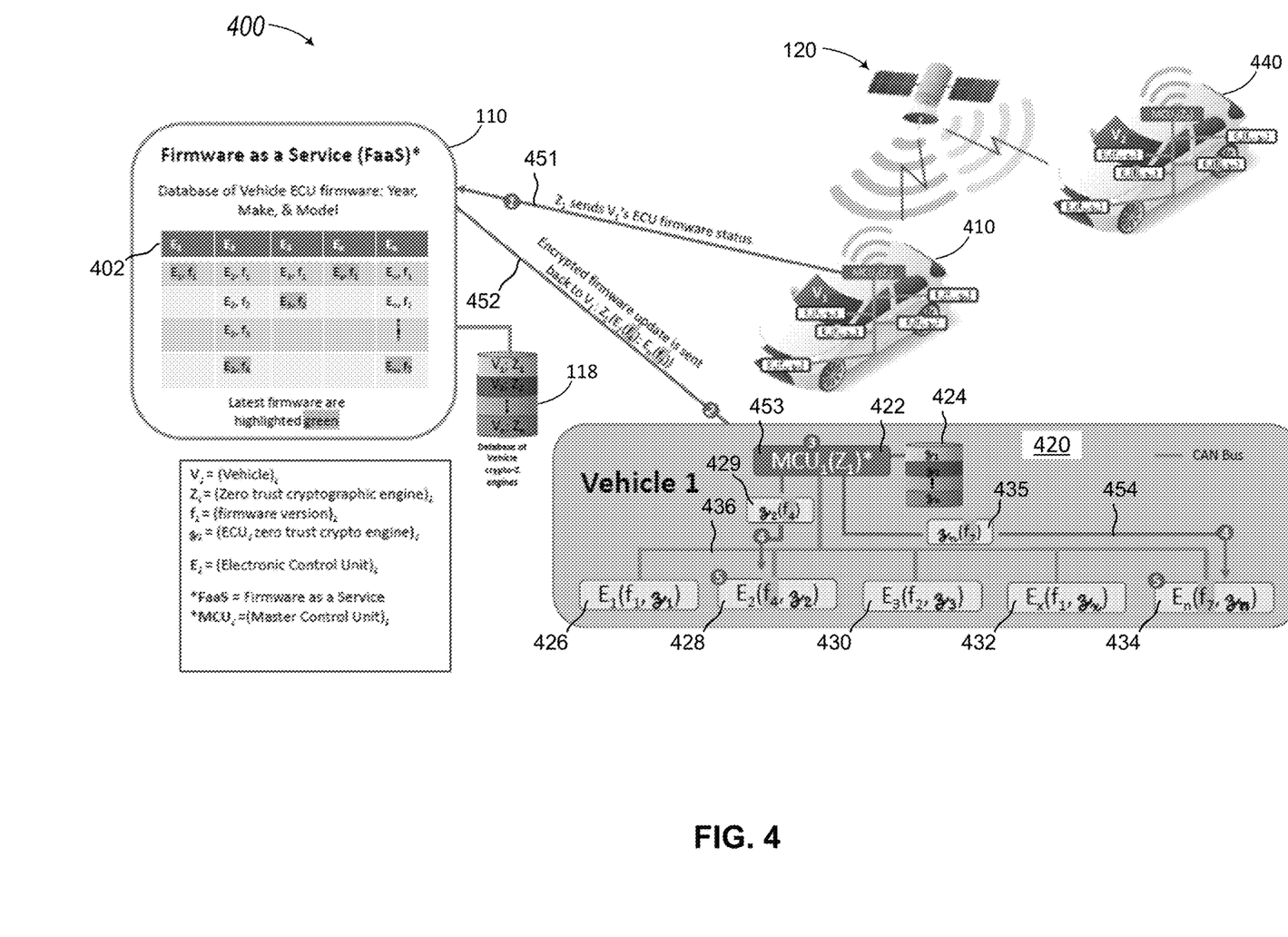
FIG. 4 is an illustrative usage example of a system for secure firmware updating consistent with the present disclosure.

FIG. 4 is an illustrative example of a flow diagram 400 for a system for secure firmware updating consistent with the present disclosure. The example of FIG. 4 illustrates a vehicle firmware update system using the z-engine technology to securely download firmware updates to vehicles registered with the FaaS system 110. In this example, FaaS system 110 may be part of a firmware distribution system for the vehicle manufacturer, whereby the vehicle manufacturer may use OTA technology to send a uniquely encrypted firmware to each vehicle that is registered with the FaaS system 110 that requires a firmware update. FaaS system 110 includes a database 402 of vehicle ECU firmware organized by ECU year, make, and model, which may be stored in information repository 114 (FIG. 1). FaaS system 110 also includes digital signature repository 118, which is a secure, tamper resistant database of the unique block box z-engine hardware digital profile for each registered vehicle. Vehicle-1 410 and vehicle-2 440 are two vehicles that are registered with the FaaS system 110 of the vehicle manufacturer.

Electronic control system (ECS) 420 is an example of the ECUs incorporated into vehicle-1 410. ECS 420 includes MCU 422, the main control unit for the ECS 420, and $ECU_1$ 426, $ECU_2$ 428, $ECU_3$ 430, $ECU_4$ 432, and $ECU_n$ 434, which in this example are all connected to MCU 422 by Controller Area Network (CAN bus) 436. MCU 422 also includes z-engines 424, which are the z-engines associated with each of $ECU_1$ 426 through $ECU_n$ 434.

In operation 451, when a vehicle such as vehicle-1 410 requires a firmware update, or the owner of the vehicle wishes to check if a firmware upgrade is available, the vehicle-1 410 sends its ECU firmware status to the FaaS system 110. In response to this request from the vehicle-1 410, the FaaS system 110 determines from database 402 which ECUs in vehicle-1 410 require firmware updates. FaaS system 110 then compiles the latest firmware and creates a specific firmware package that contains only the updates required by vehicle-1 410, to be sent to vehicle-1 410. In this example, only $ECU_2$ 428 and $ECU_n$ 434 for vehicle-1 410 require updates. Once the FaaS system 110 has compiled the required firmware updates, the FaaS system 110 encrypts the specific firmware package for vehicle-1 410 by using the z-engine for vehicle-1 410 from digital signature repository 118. In operation 452, the FaaS system 110 sends the encrypted specific firmware package to vehicle-1 410 using OTA via network 120.

In operation 453, the MCU 422 decrypts the firmware for $ECU_2$ 428 and $ECU_n$ 434, determines which of the ECUs are to receive updated firmware, and separates the decrypted firmware into one or more individual firmware modules. The MCU 422 separates the firmware modules into individual modules for each of the ECUs that are to receive updated firmware. The MCU 422 then re-encrypts the firmware for $ECU_2$ 428 with specific z-engine circuitry for each of the individual firmware modules, i.e., $V_i$-z-engine 429 and the firmware for $ECU_n$ 434 with $V_n$-z-engine 435. In operation 454, the re-encrypted firmware is broadcast over the CAN Bus 436 to the ECUs. Since the particular firmware updates for each ECU have been encrypted using the specific z-engine for that ECU, only the $ECU_2$ 428 in vehicle-1 410 can decipher the firmware for $ECU_2$ 428 and only the $ECU_n$ 434 can decipher the firmware for the $ECU_n$ 434. The $ECU_2$ 428 and the $ECU_n$ 434 then decrypt the specific firmware packages and update their firmware. Vehicle-1 410 now has the latest firmware.

Figure 5A:
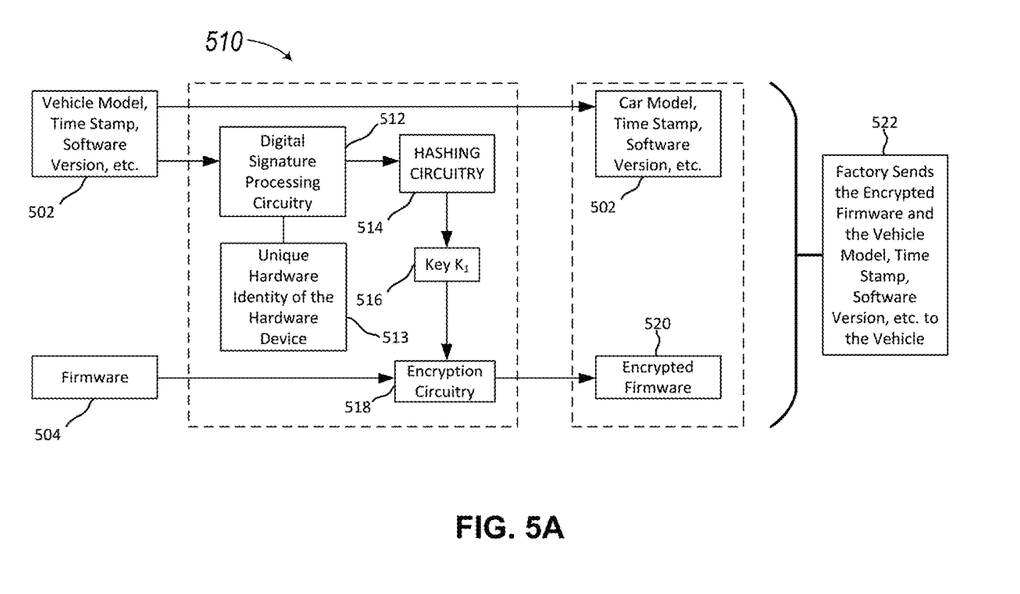
FIG. 5A is a functional block diagram of one illustrative example of firmware encryption circuitry consistent with the present disclosure.

FIG. 5A is a functional block diagram of one illustrative example of firmware encryption circuitry consistent with the present disclosure. The illustrative example of FIG. 5A is a detailed block diagram of the z-engine 510 of the FaaS system, for example, z-engine circuitry 116 from FIG. 1. The example of FIG. 5A is also illustrative of the z-engine of FaaS system 110 of FIG. 4. In FIG. 5A, the z-engine 510 receives device data 502 for a specific firmware upgrade for a specific device. The device data 502 may include, but is not limited to, the model of the device that requires the upgrade, a time stamp or other non-repeating input data to use as a seed in the key generation as described above, a version of the firmware or software to be encrypted, etc.

The z-engine 510 receives the device data 502 and separates the time stamp or other non-repeating input data to use as a seed in the key generation from the other device data. The z-engine 510 determines the specific device the upgrade is targeted to from the device data 502 and retrieves the hardware digital profile of the specific hardware device 513 from the digital signature repository 118. The z-engine 510 then processes the seed with the digital signature processing circuitry 512 to create a unique signature based for the specific hardware device. The result of this process is then processed by hashing circuitry 514, which may be, for example, one-way message digest algorithm, for example a Secure Hash Algorithm (e.g., SHA-1, SHA-2, SHA-256, SHA-512, etc.) hash function and/or other types of hash functions such as MD6, etc. The result of the hashing circuitry 514 is an encryption key 516, in this example the encryption key is denoted as $K_1$.

In an embodiment, the non-repeating input data, represented in binary numbers, is allowed to be modified by the z-engine hardware profile. In some embodiments, the non-repeating input data is modified using exclusive or (XOR) Boolean algebra.

The z-engine 510 also receives the firmware package 504 to be sent to the particular device. The firmware package 504 is then encrypted by encryption circuitry 518 to generate a file that can only be decrypted with a key generated by the z-engine in the particular device the firmware upgrade is targeted to. The z-engine 510 then sends a package 522 of the original device data 502 and the encrypted firmware 520 to the particular hardware device that the firmware upgrade is targeted to. Once the firmware has been encrypted, the dynamic encryption key 516 is discarded, since the dynamic key, based on the non-repeating input data, is no longer valid.

Figure 5B:
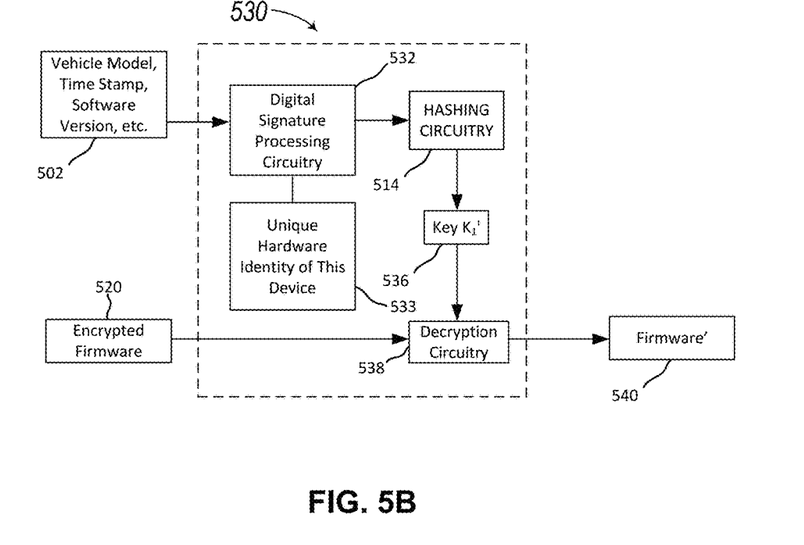
FIG. 5B is a functional block diagram of one illustrative example of firmware decryption circuitry consistent with the present disclosure.

FIG. 5B is a functional block diagram of one illustrative example of firmware decryption circuitry consistent with the present disclosure. The illustrative example of FIG. 5B is a detailed block diagram of the z-engine 530 of the device to be upgraded, for example, z-engine circuitry 204 from FIG. 2. The example of FIG. 5B is also illustrative of the z-engines of vehicle-1 410 of FIG. 4. In FIG. 5B, the z-engine 530 receives device data 502 for a specific firmware upgrade for the specific device that contains z-engine 530. The device data 502 may include, but is not limited to, the model of the device that requires the upgrade, a time stamp or other non-repeating input data to use as a seed in the key generation as described above, a version of the firmware or software to be encrypted, etc.

The z-engine 530 receives the device data 502 and separates from the other device data the time stamp or other non-repeating input data that was used to generate the encryption key to use as a seed in the generation of the decryption key. The z-engine 530 then processes the seed with the hardware digital profile of this device 533, which is identical to the hardware digital profile of the specific hardware device 513, using the digital signature processing circuitry 532 to create a unique signature based on the specific hardware device. The result of this process is then processed by hashing circuitry 514, which is the same hash function used by z-engine 510 to generate the encryption key 516. The result of the hash function 514 is a decryption key 536, in this example the key is denoted as $K_1'$.

The z-engine 530 also receives the encrypted firmware 520 from the FaaS system. The firmware 520 is then decrypted by decryption circuitry 538 to generate the firmware' 540. Once the firmware has been decrypted, the dynamic decryption key 536 is discarded, since the dynamic key, based on the non-repeating input data, is no longer valid. If the encrypted firmware 520 is intended for the actual hardware containing the z-engine 530, then the firmware' 540 will be identical to the firmware package 504.

Figure 6:
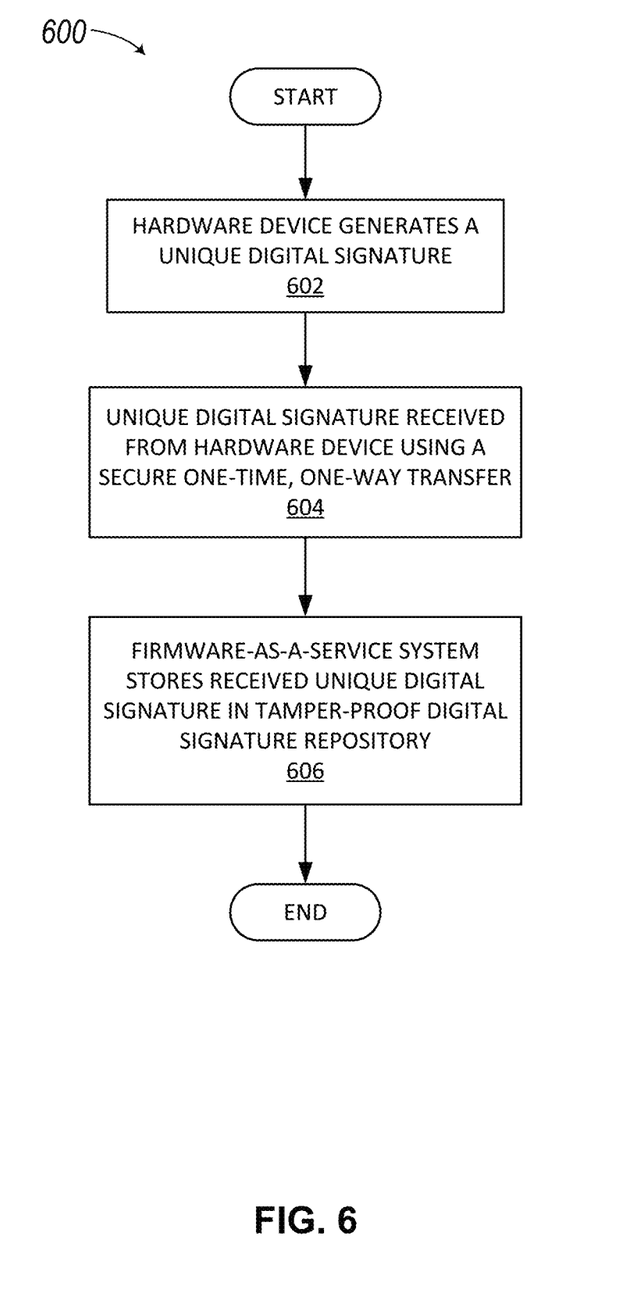
FIG. 6 is a flowchart diagram depicting operations for a registration procedure on the system for secure firmware updating of FIG. 1, consistent with the present disclosure.

FIG. 6 is a flowchart diagram depicting operations for a registration procedure on the system for secure firmware updating of FIG. 1, consistent with the present disclosure. It should be appreciated that embodiments of the present disclosure provide at least for the registration procedure on the system for secure firmware updating. However, FIG. 6 provides only an illustration of one implementation and does not imply any limitations with regard to the environments in which different embodiments may be implemented. Many modifications to the depicted environment may be made by those skilled in the art without departing from the scope of the disclosure as recited by the claims.

In the illustrated example embodiment, in operation 602, the hardware device generates a unique and random (e.g., from a TRNG) digital pattern stored on the designated hardware. The hardware device then sends the unique digital pattern to the FaaS system, for example, FaaS system 110 from FIG. 1. This pattern can be obtained from any non-cloneable events such as human signature on a signature pad or a radioactive decay pattern.

In one illustrative example embodiment, the unique feature of the hardware device may be a PUF included in the hardware device during manufacturing. Unlike other cryptographic uses of a PUF, however, in the z-engine the PUF is only used during registration, and then the z-engine stores the unique digital signature of the device based on the PUF at the time of registration. In this way, if the PUF changes over time due to factors such as deterioration of the device, the unique digital signature will not be affected since it is stored in the z-engine only at the time of registration.

In another illustrative example embodiment, the unique feature of the hardware device may be obtained from a signature of the owner of the hardware device on a digital signature pad. In this example, the owner of the hardware device would sign or draw on a digital pad, and the signature would be used as the unique feature by recording many parameters of the signature. These parameters may include, but are not limited to, the position of each pixel in the signature, the pressure applied to each pixel of the signature by the stylus (i.e., a typical signature pad may resolve 4096 or more levels of pressure), the speed of each stroke of the signature, the color of the digital ink, etc. When all these factors are incorporated into a description of the signature, duplicating the exact signature would be impossible.

In yet another illustrative example embodiment, the unique feature of the device may be obtained using a true random number, such as from a TRNG.

In other embodiments, any unique, unclonable property of the hardware device or its environment, such as random electromagnetic waves received by an antenna, may be used as the unique feature for generating the unique digital hardware profile for the z-engine. In addition, these random patterns can be enhanced by a pseudo-random number generator, or by tapping into TRNG attributes of hardware to replace the human interaction altogether.

In operation 604, the FaaS system receives the unique digital signature from the hardware device. In order to maintain the security of the unique digital signature, the transfer takes place using a secure, one-time, one-way transfer between the hardware device and the FaaS system. In addition, the unique hardware signature is not visible outside the z-engine at either the device end or the FaaS system end. In some embodiments, the system may utilize Diffie Hellman key exchange protocol to securely send the unique digital signature of the z-engine of the MCU to the FaaS server.

In operation 606, the FaaS system stores the unique digital signature received from the hardware device in a secure digital signal repository, for example, digital signature repository 118 of FIG. 1. As mentioned above, the digital signature repository may be a tamper-proof repository for security of the unique z-engine. The registration process is then complete.

Figure 7:
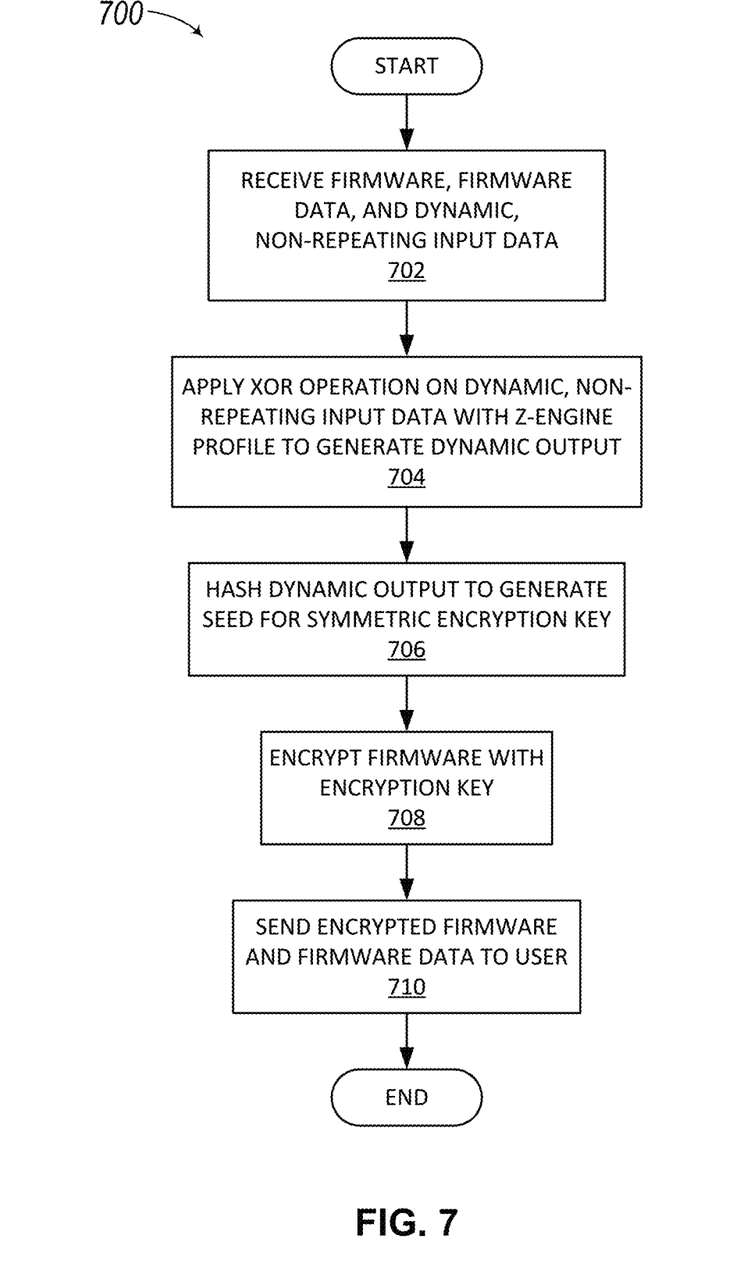
FIG. 7 is a flowchart diagram depicting operations for a firmware encryption procedure on the system for secure firmware updating of FIG. 1, consistent with the present disclosure.

FIG. 7 is a flowchart diagram depicting operations for a firmware encryption procedure on the system for secure firmware updating of FIG. 1, consistent with the present disclosure. It should be appreciated that embodiments of the present disclosure provide at least for the encryption procedure on the system for secure firmware updating. However, FIG. 7 provides only an illustration of one implementation and does not imply any limitations with regard to the environments in which different embodiments may be implemented. Many modifications to the depicted environment may be made by those skilled in the art without departing from the scope of the disclosure as recited by the claims.

In operation 702 of the illustrated example embodiment, the z-engine receives the firmware to be issued to the hardware device, along with firmware data and the non-repeating input data. In some embodiments, the non-repeating input data may be sent in clear (unsecured) text, since without the z-engine of the particular hardware device, the encryption key cannot be generated from the non-repeating input data. The firmware data may include, but is not limited to, the make and model of the hardware device the firmware is applicable to, the version of the firmware, the specific device the firmware is applicable to, e.g., a specific ECU in a vehicle with a plurality of ECUs, etc. The non-repeating input data may be, for example, a timestamp, such as a Unix timestamp.

In operation 704, the z-engine applies an XOR operation on the dynamic, non-repeating input data with unique digital signature of the z-engine to generate a dynamic, unique result. The dynamic, unique result of this operation is a dynamic output that never repeats. The probability of a collision should be no less than a one in one trillion possibility. There is a possibility, however small, that a different input data can produce the same hash digest.

In operation 706, the z-engine performs a hash operation on the dynamic, unique result to generate a seed for symmetric encryption key for symmetric algorithms. In an embodiment, the output from the hash operation may be used as a seed for an Advanced Encryption Algorithm (AES) operation.

In operation 708, the z-engine uses the dynamic encryption key to encrypt the firmware received in operation 702.

In operation 710, the FaaS system sends the encrypted firmware and the firmware data, including the non-repeating input data used to generate the encryption key, to the particular device to be upgraded. The firmware encryption process is then complete.

Figure 8:
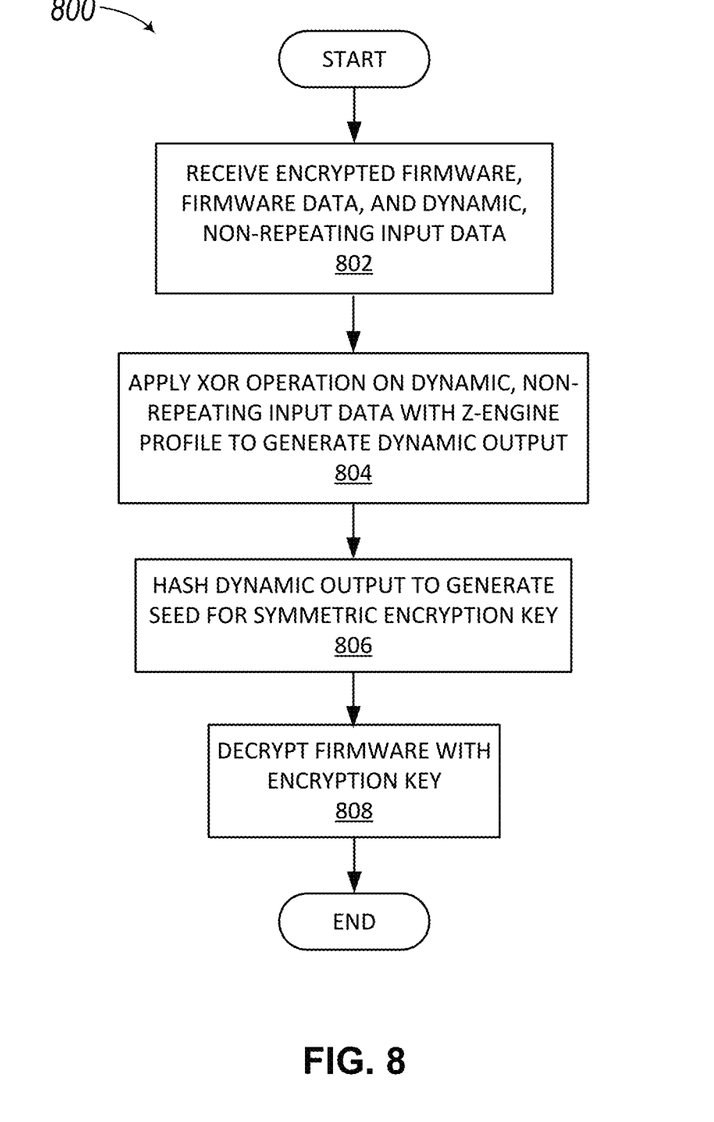
FIG. 8 is a flowchart diagram depicting operations for a firmware decryption procedure on the system for secure firmware updating of FIG. 1, consistent with the present disclosure.

FIG. 8 is a flowchart diagram depicting operations for a firmware decryption procedure on the system for secure firmware updating of FIG. 1, consistent with the present disclosure. It should be appreciated that embodiments of the present disclosure provide at least for the decryption procedure on the system for secure firmware updating. However, FIG. 8 provides only an illustration of one implementation and does not imply any limitations with regard to the environments in which different embodiments may be implemented. Many modifications to the depicted environment may be made by those skilled in the art without departing from the scope of the disclosure as recited by the claims.

In operation 802, the particular hardware device to be upgraded receives the encrypted firmware, the firmware data, and the non-repeating input data from the FaaS system. In some embodiments, the firmware data and the non-repeating input data may be sent as clear text.

In operation 804, the z-engine applies an XOR operation on the dynamic, non-repeating input data with the unique digital signature of the z-engine to generate a dynamic, unique result. The dynamic, unique result of this operation is a dynamic output that never repeats. For most secure application, the probability of a collision should be made sufficiently large (i.e., no less than a one in one trillion possibility) to avoid using same encryption key. There is a possibility, however small, that in all known hash algorithm, a different input data can produce the same hash digest.

In operation 806, the z-engine performs a hash operation on the dynamic, unique result to generate a seed for symmetric encryption key for symmetric algorithms. In an embodiment, the output from the hash operation may be used as a seed for an Advanced Encryption Algorithm (AES) operation.

In operation 808, the z-engine uses the dynamic decryption key to decrypt the firmware received in operation 802. The firmware decryption process is then complete.

Figure 9:
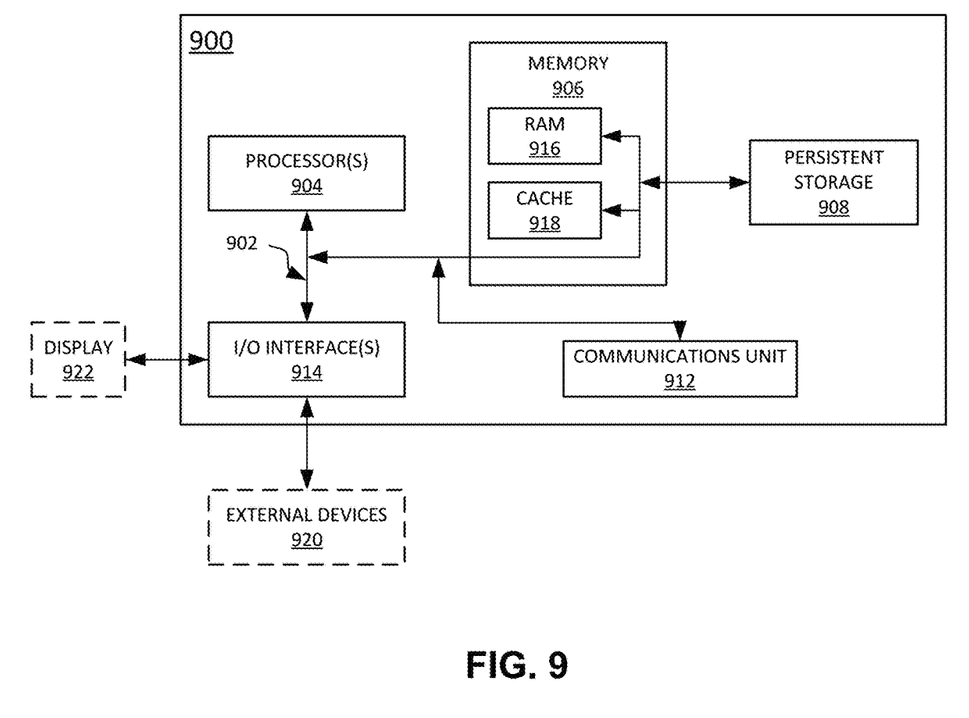
FIG. 9 depicts a block diagram of components of the computing device executing the operations within the system of FIG. 1, consistent with the present disclosure.

FIG. 9 is a block diagram depicting components of one example of the computing devices 112, 132, and 142 suitable for secure firmware updating, within the distributed data processing environment of FIG. 1, consistent with the present disclosure. FIG. 9 displays the computing device or computer 900, one or more processor(s) 904 (including one or more computer processors), a communications fabric 902, a memory 906 including a random-access memory (RAM) 916 and a cache 918, a persistent storage 908, a communications unit 912, I/O interfaces 914, a display 922, and external devices 920. It should be appreciated that FIG. 9 provides only an illustration of one embodiment and does not imply any limitations with regard to the environments in which different embodiments may be implemented. Many modifications to the depicted environment may be made.

As depicted, the computer 900 operates over the communications fabric 902, which provides communications between the computer processor(s) 904, memory 906, persistent storage 908, communications unit 912, and input/output (I/O) interface(s) 914. The communications fabric 902 may be implemented with an architecture suitable for passing data or control information between the processors 904 (e.g., microprocessors, communications processors, and network processors), the memory 906, the external devices 920, and any other hardware components within a system.

For example, the communications fabric 902 may be implemented with one or more buses.

The memory 906 and persistent storage 908 are computer readable storage media. In the depicted embodiment, the memory 906 comprises a RAM 916 and a cache 918. In general, the memory 906 can include any suitable volatile or non-volatile computer readable storage media. Cache 918 is a fast memory that enhances the performance of processor(s) 904 by holding recently accessed data, and near recently accessed data, from RAM 916.

Program instructions for secure firmware updating may be stored in the persistent storage 908, or more generally, any computer readable storage media, for execution by one or more of the respective computer processors 904 via one or more memories of the memory 906. The persistent storage 908 may be a magnetic hard disk drive, a solid-state disk drive, a semiconductor storage device, flash memory, read only memory (ROM), electronically erasable programmable read-only memory (EEPROM), or any other computer readable storage media that is capable of storing program instruction or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

The communications unit 912, in these examples, provides for communications with other data processing systems or devices. In these examples, the communications unit 912 includes one or more network interface cards. The communications unit 912 may provide communications through the use of either or both physical and wireless communications links. In the context of some embodiments of the present disclosure, the source of the various input data may be physically remote to the computer 900 such that the input data may be received, and the output similarly transmitted via the communications unit 912.

The I/O interface(s) 914 allows for input and output of data with other devices that may be connected to computer 900. For example, the I/O interface(s) 914 may provide a connection to external device(s) 920 such as a keyboard, a keypad, a touch screen, a microphone, a digital camera, and/or some other suitable input device. External device(s) 920 can also include portable computer readable storage media such as, for example, thumb drives, portable optical or magnetic disks, and memory cards. Software and data used to practice embodiments of the present disclosure can be stored on such portable computer readable storage media and can be loaded onto persistent storage 908 via the I/O interface(s) 914. I/O interface(s) 914 also connect to a display 922.

Display 922 provides a mechanism to display data to a user and may be, for example, a computer monitor. Display 922 can also function as a touchscreen, such as a display of a tablet computer. In some embodiments, the encryption/decryption functionality and systems described herein may be bypassed. In the context of the automotive example described above, the ability to bypass the encryption/decryption functionality and systems described herein may enable an owner to directly update/manipulate firmware, for example, as may be performed by car enthusiasts/hobbyist for performance enhancements, etc.

According to one aspect of the disclosure, there is thus provided a system for secure firmware updating, the system comprising: one or more user devices, each of the one or more user devices having one or more firmware modules; one or more computing devices; a digital signature repository; and a z-engine circuitry. The z-engine circuitry is configured to: receive firmware for a particular user device of the one or more user devices; receive a non-repeating input data; retrieve a hardware digital profile of the particular user device from the digital signature repository; process the non-repeating input data with the hardware digital profile to generate a unique result; perform a hash operation on the unique result to generate an encryption key; encrypt the firmware for the particular user device with the encryption key; and send the encrypted firmware to the particular user device.

According to another aspect of the disclosure, there is thus provided a zero-trust cryptographic engine, the zero-trust cryptographic engine comprising: a digital signature circuitry; a hashing circuitry; and an encryption circuitry. The zero-trust cryptographic engine is configured to: receive firmware for a particular user device; receive a non-repeating input data; retrieve a hardware digital profile of the particular user device; process the non-repeating input data with the hardware digital profile using the digital signature circuitry to generate a dynamic data; hash the dynamic data using the hashing circuitry to generate an encryption key; and encrypt the firmware for the particular user device with the encryption key.

According to yet another aspect of the disclosure, there is thus provided a computer-implemented method of secure firmware updating, the computer implemented method comprising: receiving, by one or more computer processors, firmware for a particular user device of one or more user devices; receiving, by the one or more computer processors, a non-repeating input data; retrieving, by the one or more computer processors, a hardware digital profile of the particular user device from a digital signature repository; processing the non-repeating input data with the hardware digital profile to generate a dynamic data; performing a hash operation on the dynamic data to generate an encryption key; and encrypting the firmware for the particular user device.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

"Circuitry," as used in any embodiment herein, may comprise, for example, singly or in any combination, hard-wired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

The present disclosure may be a system, a method, and/or a computer program product. The system or computer program product may include one or more non-transitory computer readable storage media having computer readable program instructions thereon for causing a processor to carry out aspects of the present disclosure.

The one or more non-transitory computer readable storage media can be any tangible device that can retain and store instructions for use by an instruction execution device. The one or more non-transitory computer readable storage media may be, for example, but is not limited to, an electronic storage device, a magnetic storage device, an optical storage device, an electromagnetic storage device, a semiconductor storage device, or any suitable combination of the foregoing. A non-transitory computer readable storage media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

What is claimed is:

1. A system for secure firmware updating, the system comprising:
   one or more user devices, each of the one or more user devices having one or more firmware modules;
   one or more computing devices;
   a digital signature repository; and
   a z-engine circuitry, the z-engine circuitry configured to:
     receive firmware for a particular user device of the one or more user devices;
     receive a non-repeating input data;
     retrieve a hardware digital profile of the particular user device from the digital signature repository;
     process the non-repeating input data with the hardware digital profile to generate a unique result;
     perform a hash operation on the unique result to generate an encryption key;
     encrypt the firmware for the particular user device with the encryption key; and
     send the encrypted firmware to the particular user device.

2. The system of claim 1, wherein receive the firmware for the particular user device of the one or more user devices further comprises:
   compile a specific firmware package that contains only one or more updates required by the particular user device.

3. The system of claim 1, wherein send the encrypted firmware to the particular user device further comprises:
   decrypt the encrypted firmware by a main control unit in the particular user device;
   separate the decrypted firmware into one or more individual firmware modules;
   encrypt the one or more individual firmware modules using a specific z-engine circuitry for each of the individual firmware modules to create one or more specific firmware modules; and
   broadcast the one or more specific firmware modules to the particular user device.

4. The system of claim 3, wherein a decryption key is discarded once the firmware has been decrypted.

5. The system of claim 1, wherein the digital signature repository is a tamper resistant hardware environment.

6. The system of claim 1, wherein the non-repeating input data is selected from a group consisting of a Unix timestamp, a first number starting from a first 16-digit generated pseudo random number and incremented by 1 each time, a second number starting from a 4-digit number generated by a True Random Number Generator (TRNG) and incremented by one each use, a third number starting from a second 16-digit number generated by the TRNG and incremented by one each use, and a date and time in a format mm:dd:yyyy:hh:mm:ss.

7. The system of claim 1, wherein the hash operation is a Secure Hash Algorithm (SHA).

8. The system of claim 1, wherein encrypt the firmware for the particular user device with the encryption key further comprises:
    discard the encryption key once the firmware is encrypted.

9. The system of claim 1, wherein the one or more user devices are vehicles.

10. A zero-trust cryptographic engine, the zero-trust cryptographic engine comprising:
    a digital signature circuitry;
    a hashing circuitry; and
    an encryption circuitry;
    the zero-trust cryptographic engine configured to:
        receive firmware for a particular user device;
        receive a non-repeating input data;
        retrieve a hardware digital profile of the particular user device;
        process the non-repeating input data with the hardware digital profile using the digital signature circuitry to generate a dynamic data;
        hash the dynamic data using the hashing circuitry to generate an encryption key; and
        encrypt the firmware for the particular user device with the encryption key.

11. The zero-trust cryptographic engine of claim 10, wherein encrypt the firmware for the particular user device with the encryption key further comprises:
    discard the encryption key once the firmware is encrypted.

12. The zero-trust cryptographic engine of claim 10, wherein receive the firmware for the particular user device further comprises:
    compile a specific firmware package that contains only one or more updates required by the particular user device.

13. The zero-trust cryptographic engine of claim 10, wherein the non-repeating input data is selected from a group consisting of a Unix timestamp, a first number starting from a first 16-digit generated pseudo random number and incremented by 1 each time, a second number starting from a 4-digit number generated by a True Random Number Generator (TRNG) and incremented by one each use, a third number starting from a second 16-digit number generated by the TRNG and incremented by one each use, and a date and time in a format mm:dd:yyyy:hh:mm:ss.

14. The zero-trust cryptographic engine of claim 10, wherein hash the dynamic data using the hashing circuitry to generate an encryption key further comprises:
    using a one-way message digest algorithm.

15. A computer-implemented method for secure firmware updating, the computer-implemented method comprising:
    receiving, by one or more computer processors, firmware for a particular user device of one or more user devices;
    receiving, by the one or more computer processors, a non-repeating input data;
    retrieving, by the one or more computer processors, a hardware digital profile of the particular user device from a digital signature repository;
    processing the non-repeating input data with the hardware digital profile to generate a dynamic data;
    performing a hash operation on the dynamic data to generate an encryption key; and
    encrypting the firmware for the particular user device.

16. The computer-implemented method of claim 15, wherein receiving the firmware for the particular user device of the one or more user devices further comprises:
    compiling, by the one or more computer processors, a specific firmware package that contains only one or more updates required by the particular user device.

17. The computer-implemented method of claim 15, wherein send the encrypted firmware to the particular user device further comprises:
    decrypting, by the one or more computer processors, the encrypted firmware;
    separating, by the one or more computer processors, the decrypted firmware into one or more individual firmware modules;
    encrypting the one or more individual firmware modules using a specific z-engine circuitry for each of the individual firmware modules to create one or more specific firmware modules; and
    broadcasting the one or more specific firmware modules to the particular user device.

18. The computer-implemented method of claim 15, wherein encrypting the firmware for the particular user device with the encryption key further comprises:
    discarding, by the one or more computer processors, the encryption key once the firmware is encrypted.

19. The computer-implemented method of claim 15, wherein the non-repeating input data is selected from a group consisting of a Unix timestamp, a first number starting from a first 16-digit generated pseudo random number and incremented by 1 each time, a second number starting from a 4-digit number generated by a True Random Number Generator (TRNG) and incremented by one each use, a third number starting from a second 16-digit number generated by the TRNG and incremented by one each use, and a date and time in a format mm:dd:yyyy:hh:mm:ss.

20. The computer-implemented method of claim 15, wherein performing a hash operation on the dynamic data to generate an encryption key further comprises:
    using a Secure Hash Algorithm (SHA).

\* \* \* \* \*